(12) United States Patent
Ramesh et al.

(10) Patent No.: US 8,214,408 B2
(45) Date of Patent: Jul. 3, 2012

(54) METHOD, DATABASE SYSTEM AND COMPUTER PROGRAM FOR JOINING TEMPORAL DATABASE TABLES

(75) Inventors: Bhashyam Ramesh, Secunderabad (IN); Manjula Koppuravuri, Secunderabad (IN); Chandrasekhar Tekur, Hyderabad (IN)

(73) Assignee: Teradata US, Inc., Dayton, OH (US)

( * ) Notice: Subject to any disclaimer, the term of this patent is extended or adjusted under 35 U.S.C. 154(b) by 497 days.

(21) Appl. No.: 12/239,868

(22) Filed: Sep. 29, 2008

(65) Prior Publication Data

US 2010/0082601 A1    Apr. 1, 2010

(51) Int. Cl.
*G06F 7/00* (2006.01)
(52) U.S. Cl. ........................................ 707/802
(58) Field of Classification Search .......... 707/802, 707/803, 812, 736, 737, 746
See application file for complete search history.

(56) References Cited

U.S. PATENT DOCUMENTS

| | | | |
|---|---|---|---|
| 6,249,789 B1 * | 6/2001 | Delia et al. | 1/1 |
| 6,629,094 B1 * | 9/2003 | Colby et al. | 707/713 |
| 6,963,885 B2 * | 11/2005 | Calkins et al. | 707/707 |
| 2002/0091707 A1 * | 7/2002 | Keller | 707/104.1 |
| 2004/0139061 A1 * | 7/2004 | Colossi et al. | 707/3 |
| 2004/0153448 A1 * | 8/2004 | Cheng et al. | 707/4 |
| 2005/0169184 A1 * | 8/2005 | Murgatroyd et al. | 370/241 |
| 2005/0283488 A1 * | 12/2005 | Colossi et al. | 707/100 |
| 2006/0122964 A1 * | 6/2006 | Yu et al. | 707/2 |
| 2008/0147603 A1 * | 6/2008 | Kostamaa et al. | 707/3 |
| 2009/0019040 A1 * | 1/2009 | Purcell et al. | 707/5 |
| 2009/0024622 A1 * | 1/2009 | Chkodrov et al. | 707/6 |

* cited by examiner

*Primary Examiner* — Angela Lie
(74) *Attorney, Agent, or Firm* — Ramin Mahboubian

(57) ABSTRACT

A method, database system and computer program are disclosed for performing a temporal join between two temporal database tables. The method includes determining a selected table intersection between a period of interest and a time period value for a selected table row, scanning an inner table for a row that matches the selected table on the join conditions and overlaps the selected table intersection, and determining the remainder time period values from the selected table intersection.

42 Claims, 4 Drawing Sheets

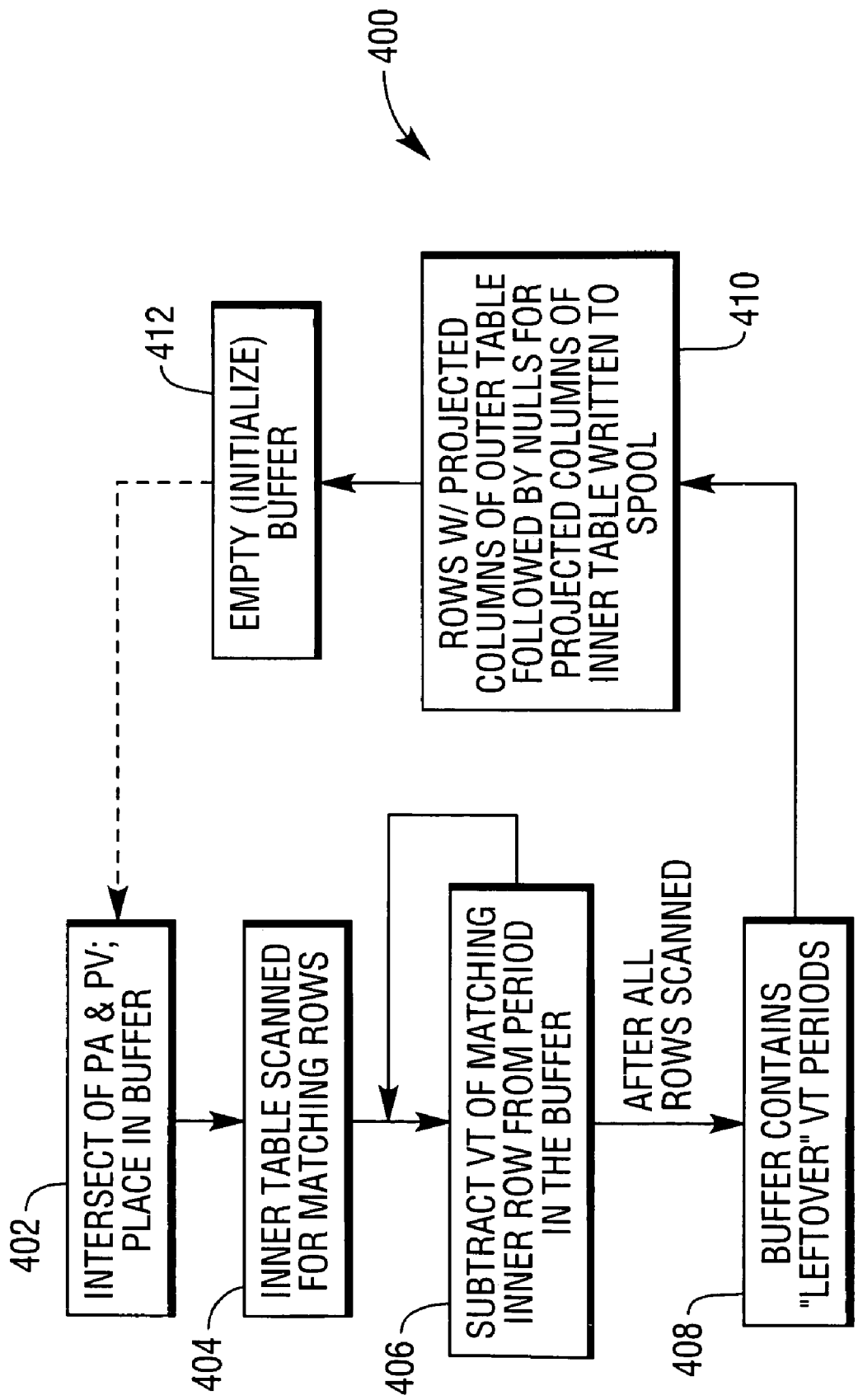

```
502 —— Set L to NULL
504 —— for each row R1 in the outer table
      begin
506 ——   Let VT1=INTERSECT(PA, R1.VT)
508 ——   add VT1 to list L
510 ——   for each row R2 in the inner table*
         begin
511 ——     let VT2=INTERSECT(PA,R2.VT)
           if R1 joins with R2 and VT1 overlaps VT2
           begin
512 ——       add the row with values (R1, R2, INTERSECT(VT1, VT2)) to the result spool
514 ——       for each value v in L
             begin
516 ——         if v overlaps VT2
               begin
518 ——           add LDIFF[1](v, VT2) to L if the LDIFF is not null
520 ——           add RDIFF[2](v, VT2) to L if the RDIFF is not null
522 ——           remove v from L
                 end v overlaps VT2
             end for
         end R1 joins with R2
524 ——   end for
         if L is non-empty
         begin
526 ——     for each value v in L
             add a row with values (R1, NULL, v) to the result spool
528 ——     empty the list L
           end L is non-empty
         end for
```

FIG. 5

METHOD, DATABASE SYSTEM AND COMPUTER PROGRAM FOR JOINING TEMPORAL DATABASE TABLES

BACKGROUND

Relational database systems store data in tables organized by columns and rows. The tables are typically linked together by "relationships" that simplify the storage of data and make complex queries against the database more efficient. Structured Query Language (SQL) is a standardized language for creating and operating on relational databases.

In some cases, databases are arranged such that data in each row of a table is associated with a particular time period. For example, a retail store may wish to keep track of employees and their sales performance over a period of time. To do so, they may set up a database table, where each row of the table contains an element "x" (where "x" may hold the name of the employee), and an element "y" (where "y" represents the total number of sales for a particular product over a defined period of time, such as a day, week, month, etc.) and the elements x, y may be associated with a "start date" and an "end date". This allows a user to know that employee "x", had sales figures "y" over a defined period of time.

This type of database is generally termed a "temporal database", and the term "temporal grouping" refers to a process where like elements that share a common or overlapping time-line (or part of a common time-line) are grouped. For example, a user may wish to perform a query on the database to determine all employees working in the store over a particular month, and their accumulated sales figures for the month. This would require the database to collate all employees who worked during the specified time period, as well as aggregating the total sales for each employee over the specified time period. That is, in addition to grouping, aggregate values may also need to be computed over given time intervals. To extend the simple example given above, the "grouping element" or "grouping value" is "x", the employee name, since all instances of the employee sales must be collated. The value to be aggregated is "y", namely the total number sales by the employee.

In a temporal table each row is associated with a valid time (VT) period indicating when the row is valid. In a temporal table each row is also associated with a transaction time (TT) period indicating when the row is recorded in the database. The values VT and TT may be more generally referred to as "time period values". The values may also be referred to by a skilled addressee as an Effective Time period or an Observation Time period. A sequenced temporal join (join between two temporal tables) requires that two rows can be joined only when the time period values of these two rows overlap. The time period values can be any time period value with a semantic meaning. Typically ValidTime and TransactionTime are used as time period value with a semantic meaning. There may be other such time period values which may also be used, depending on the specific database and the information/data values contained therein.

In an outer join, the rows of the outer table that do not have a matching row in the inner table are also produced in the result with NULL values for the inner table column.

In a temporal outer join an outer table row may only be partially covered by the inner table rows. In other words, there may be one or more portions of valid time of the outer table row that have no matching row for the portions in the inner table. The result must contain rows with the projected columns of the outer table followed by NULL values for the projected columns of the inner table for such remainder or "left over" portions of valid time. Temporal outer join requires additional processing to identify the remainder portions of each outer table row. This needs to be done efficiently in order to optimize the join.

In many prior art solutions, a temporal outer join is performed by first expanding the outer and inner table rows based on their valid time periods. The outer join is then performed on the expanded tables at each time granule as an intermediate result. That is, each outer and inner table row is expanded such that there is one row for each time granule. The intermediate result is then collapsed to give the final result. This is a computationally expensive process.

SUMMARY

An optimization technique is provided that allows the joining of data in two temporal database tables by performing, in one embodiment, only a single scan of the database table.

In general, in one aspect, the invention features a method for performing a temporal join between two temporal database tables, where the method includes determining a selected table intersection between a period of interest and a time period value for a selected table row, scanning an inner table for a row that matches the selected table on a join condition and overlaps the selected table intersection, and determining remainder time period values from the selected table intersection.

Implementations of the invention may include one or more of the following. The method may further include the step of scanning rows of the outer table intersection, wherein remainder time period values that do not overlap with any time period value for matching inner rows are outputted with a NULL value for inner table column values. The method may also include the further step of initializing the outer table time period value set with the outer table intersection for each outer row.

Moreover, the method may further include the step of maintaining the matching and non-matching time period values. The step of initializing the remainder time period value may be performed utilizing the outer table intersection value. Each matching and overlapping inner table row may be read, followed by determining the overlapping portion of the inner table row with the original outer table intersection value and outputting the overlapped portion as the time period value of the result row. For each matching and overlapping inner table row, the remainder ("left over") time period values may be replaced with the remainder time period values determined from the new inner table intersection value.

Each remainder time period value determination may be the LDIFF of the remainder time period value and the new inner table intersection value and the RDIFF of the remainder time period value and the new inner table intersection value.

The method may also include the further step of determining if the remainder time period values set is NULL, and if so, then setting a flag to refrain from carrying out a refresh operation for all future matching and overlapping inner table rows. The method may also include the further step of, determining if no more matching inner rows exist and if the remainder time period values set is not NULL, and if so, then outputting a row for each of the remainder time period value from the set with the remainder time period value as the time period value of the output row and with the columns of the inner table row set to NULL for the result.

The further step of sorting the inner and outer rows on the join columns may be performed. Where the inner and outer rows are sorted on the join columns, the method may include the further step of determining whether the hash value of the new inner table row is greater than the hash value of the outer table row, and if so, then outputting each of the remainder time period values from the set as the time period value of the result row. All outer table rows that have a non-NULL outer table intersection value may be outputted.

In general, in another aspect, the invention features a database system for accessing a database. The database system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities; and an optimizer for optimizing the joining of two or more temporal database tables, wherein, if a query to join two database tables is invoked, the process determines a selected table intersection between a period of interest and a time period value for a selected table row, scans an inner table for a row that matches the selected table on a join condition and overlaps the selected table intersection, and determines remainder time period values from the selected table intersection.

In general, in another aspect, the invention features a computer program, stored on a tangible storage medium, for use in joining data across two or more temporal database tables. The program includes executable instructions that cause a computer to determine a selected table intersection between a period of interest and a time period value for a selected table row, scan an inner table for a row that matches the selected table on a join condition and overlaps the selected table intersection, and determine remainder time period values from the selected table intersection.

Other features and advantages will become apparent from the description and claims that follow.

BRIEF DESCRIPTION OF THE DRAWINGS

FIG. 4 is a flow chart of a temporal join technique.
FIG. 5 is a listing of pseudo-code.

DETAILED DESCRIPTION

Figure 1:
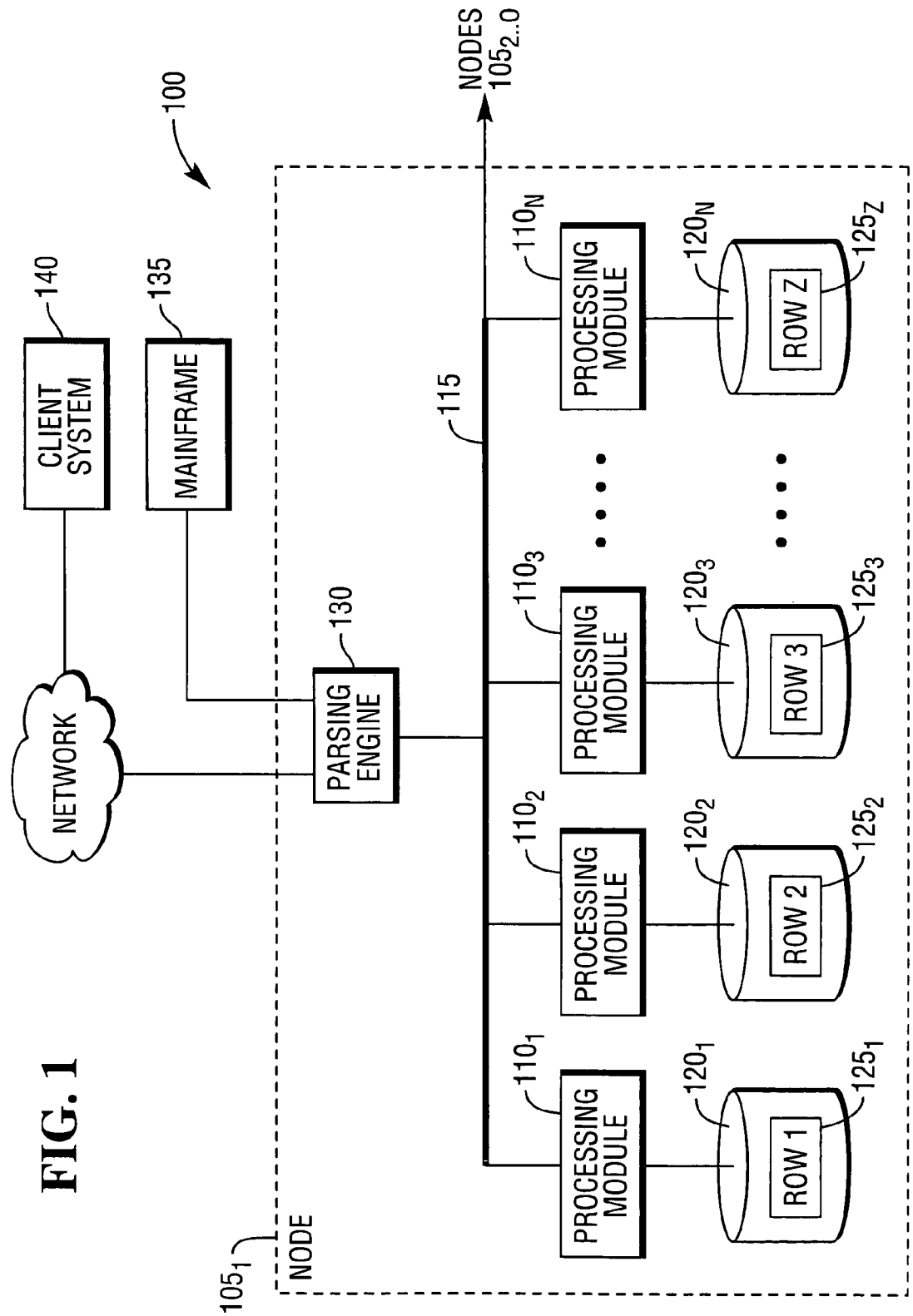
FIG. 1 is a block diagram of a node of a database system.

The sequenced temporal database table joining method, database system and computer program disclosed herein has particular application to large databases that might contain many millions or billions of records managed by a database system ("DBS") 100, such as a Teradata Active Data Warehousing System available from Teradata Corporation. FIG. 1 shows a sample architecture for one node $105_1$ of the DBS 100. The DBS node $105_1$ includes one or more processing modules $110_{1 \ldots N}$, connected by a network 115 that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on each physical processor. If there are 8 virtual processors and 4 physical processors, the operating system would distribute the 8 virtual processors across the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries in a standard format, such as SQL.

Figure 2:
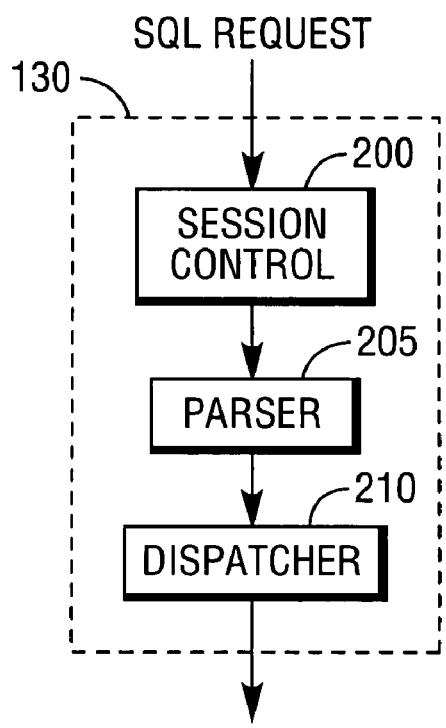
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
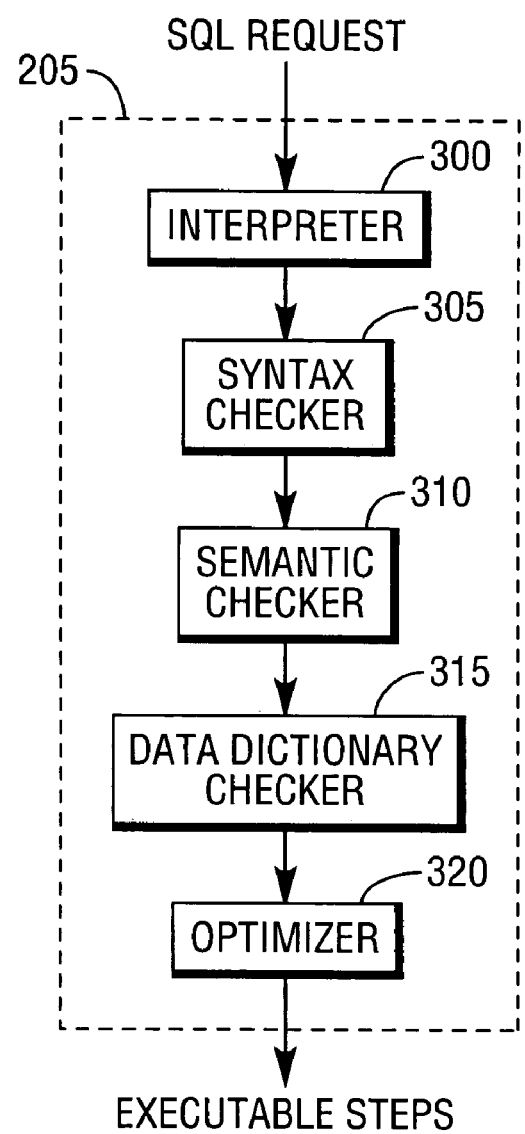
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks the request for correct SQL syntax (block 305), evaluates the request semantically (block 310), and consults a data dictionary to ensure that all of the objects specified in the SQL request exist and that the user has the authority to perform the request (block 315). Finally, the parser 205 runs an optimizer (block 320) that selects the least expensive plan to perform the request.

In the case where a user wishes to perform an outer join of temporal data in two tables, the optimizer (block 320) recognizes the query type and utilizes an algorithm or methodology in accordance with the embodiment disclosed herein. The algorithm dynamically adjusts the time portion to determine the non-matching portions. This is achieved with a single scan of the outer table.

The algorithm is now described with reference to the flow chart 400 of FIG. 4. For each outer table row the valid time period value (PV) that intersects with the query's period of interest (PA) is initially placed in the buffer (step 402). That is, the command INTERSECT (PA, PV) is initially placed in a buffer.

The inner table is scanned for a matching row (step 404), and when one is found, the VT of the matching inner table row is subtracted from the period(s) in the buffer (step 406). At the end of the scan, for each outer table row, the buffer contains remainder VT periods for that row (step 408). For the remainder durations, rows with the projected columns of the outer table row followed by NULLs for the projected columns of the inner table row are written to the result spool (step 410). The buffer is initialized for each outer table row with the outer table intersection (step 412).

In more detail, an algorithm that may be utilized to implement an embodiment of the invention is now described with reference to pseudo-code 500 of FIG. 5.

Firstly, the temporary buffer 'L' (which is in the form of a list) is set to NULL (step 502). Then, for each row R1 in, the outer table (step 504), a temporary period VT1 is defined as the intersection of the query's period of interest PA, and the valid time period VT of R1 (step 506). The period VT1 is added to buffer L (step 508). Then, for each row R2 in the inner table (step 510) a temporary period VT2 is defined as the intersection between the query's period of interest PA, and the valid time period VT of R2 (step 511). Thereafter, if R1 joins with R2 and VT1 overlaps VT2 (step 512), the row with values R1, R2, and the intersection of VT1 and VT2 is added to the result spool. Then, for each value v in temporary buffer L (step 514), if v overlaps with VT2 (step 516) the LDIFF of v and VT2 is added to L if the LDIFF is not NULL (step 518). Similarly, the RDIFF of v and VT2 are added to L if the RDIFF is not NULL (step 520). Thereafter, the value v is removed from L (step 522).

If L is non-empty (step 524), then for each value v in L, a row with values R1, NULL and v are added to the result spool (step 526). Thereafter, L is emptied (step 528)

The algorithm is valid for both equality and inequality joins. For an equality join the scan of the inner table, for each outer table row, can terminate when the row hash value changes if the two tables are in sorted order.

The method, database system and computer program described herein provides a number of advantages. As the algorithm is "temporal-aware", it scans the outer table only once, providing a more computationally efficient method of performing a join operation, when compared to join algorithms that require multiple scans of the outer table.

In addition, as the outer table is scanned only once, there is no creation of large spools before the actual join operation takes place. In contrast, prior art methods require the input tables to be expanded on valid time granules. This requires a large amount of memory to store the expanded rows. This becomes even more problematic if the valid time period of one or more rows spans a large time period.

Moreover, in prior art methods, once input tables are expanded, the intermediate result must be collapsed in order to provide a final output. This makes the join inefficient, as more computations are required, which in turn, utilizes more computing resources, such as CPU time and memory (volatile and non-volatile) storage. The algorithm outlined herein, when implemented as a method, database system, or computer program, avoids expand/collapse operations and directly performs the join operation. This creates efficiencies, as less CPU time is utilized to perform the join operation, when compared to algorithms that require expansion of the input tables.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A method implemented by a computing system for performing a temporal join between two or more temporal database tables based on at least one join condition, wherein the temporal database tables involved in the temporal join include an inner table and an outer table, and wherein the method includes:

determining, by the computing system a selected table intersection between a period of interest and a time period value for a selected table row of the outer table;

scanning the inner table for a row that matches the selected table intersection on the at least one join condition and overlaps the selected table intersection;

and determining for one or more rows of the inner table that match the selected table intersection, one or more remainder time period values from the selected table intersection.

2. The method of claim 1, further including scanning rows of an outer table intersection of the outer table, wherein remainder time period values that do not overlap with any time period value for matching inner rows are outputted with a NULL value for inner table column values.

3. The method of claim 1, further including initializing an outer table time period value set of the outer table with the outer table intersection for each outer row.

4. The method of claim 1, further including maintaining the matching and non-matching time period values.

5. The method of claim 4, further including initializing the remainder time period value utilizing the outer table intersection value.

6. The method of claim 5, further including reading each matching and overlapping inner table row, determining the overlapping portion of the inner table row with the original outer table intersection value and outputting the overlapped portion as the time period value of the result row.

7. The method of claim 6, further including, for each matching and overlapping inner table row, replacing the remainder time period values with the remainder time period values determined from a new inner table intersection value.

8. The method of claim 7, wherein each remainder time period value determination is the LDIFF of remainder time period value and the new inner table intersection value and the RDIFF of remainder time period value and the new inner table intersection value.

9. The method of claim 8, further including determining if the remainder time period values set is NULL, and if so, then setting a flag to refrain from carrying out a refresh operation for all future matching and overlapping inner table rows.

10. The method of claim 9, further including determining if no more matching inner rows exist and the remainder time period values set is not NULL, and if so, then outputting a row for each of the remainder time period value from the set with the remainder time period value as the time period value of the output row and with the columns of the inner table row set to NULL for the result.

11. The method of claim 10, further including sorting the inner and outer rows on the join columns.

12. The method of claim 11, further including determining whether the hash value of the new inner table row is greater than the hash value of the outer table row, and if so, then outputting each of the remainder time period values from the set as the time period value of the result row.

13. The method of claim 12, further of outputting all outer table rows that have a non-NULL outer table intersection value.

14. A database system for accessing a database, including a massively parallel processing system, which includes one or more nodes, a plurality of CPUs, each of the one or more nodes providing access to one or more of the CPUs, each of the one or more CPUs providing access to one or more processes, each process configured to manage data stored in one of a plurality of data-storage facilities; and an optimizer for optimizing the joining of two or more temporal database tables, including an inner table and an outer table, wherein, if a query to join the two database tables is invoked on at least one join condition, at least one of the processes determines a selected table intersection between a period of interest and a time period value for a selected table row of the outer table, scans the inner table for a row that matches the selected table intersection on the at least one join condition and overlaps the selected table intersection, and determines, for one or more rows of the inner table that match the selected table intersection, one or more remainder time period values from the selected table intersection.

15. The database system of claim 14, wherein the at least one process further scans rows of an outer table intersection of the outer table, and wherein remainder time period values that do not overlap with any time period value for matching inner rows are outputted with a NULL value for inner table column values.

16. The database system of claim 14, wherein the at least one process further initializes an outer table time period value set of the outer table with the outer table intersection for each outer row.

17. The database system of claim 14, wherein the at least one process further maintains the matching and non-matching time period values.

18. The database system of claim 17, wherein the at least one process further initializes the remainder time period value utilizing the outer table intersection value.

19. The database system of claim 18, wherein the at least one process further reads each matching and overlapping inner table row, determines the overlapping portion of the inner table row with the original outer table intersection value and outputs the overlapped portion as the time period value of the result row.

20. The database system of claim 19, wherein the at least one process, for each matching and overlapping inner table row, further replaces the remainder time period values with the remainder time period values determined from a new inner table intersection value.

21. The database system of claim 20, wherein each remainder time period value determination is the LDIFF of remainder time period value and the new inner table intersection value and the RDIFF of remainder time period value and the new inner table intersection value.

22. The database system of claim 21, wherein the at least one process further determines if the remainder time period values set is NULL, and if so, then sets a flag to refrain from carrying out a refresh operation for all future matching and overlapping inner table rows.

23. The database system of claim 22, wherein the at least one process further determines if no more matching inner rows exist and the remainder time period values set is not NULL, and if so, then a row for each of the remainder time period value from the set with the remainder time period value as the time period value of the output row and with the columns of the inner table row set to NULL for the result.

24. The database system of claim 23, wherein the at least one process further sorts the inner and outer rows on the join columns.

25. The database system of claim 24, wherein the at least one process further determines whether the hash value of the new inner table row is greater than the hash value of the outer table row, and if so, then outputs each of the remainder time period values from the set as the time period value of the result row.

26. The database system of claim 25, wherein the at least one process further outputs all outer table rows that have a non-NULL outer table intersection value.

27. A non-transient tangible storage medium storing at least computer executable code for use in joining data across two or more temporal database tables based on at least one join condition, wherein the temporal database tables involved in the temporal join include an inner table and outer table, computer executable code including executable instructions that when executed by a computer cause the computer to:
    determine a selected table intersection between a period of interest and a time period value for a selected table row of the outer table;
    scan the inner table for a row that matches the selected table intersection on the at least one join condition and overlaps the selected table intersection; and
    determine, for one or more rows of the inner table that match the selected table intersection, one or more remainder time period values from the selected table intersection.

28. The non-transient tangible storage medium of claim 27, further including executable instructions that cause the computer to scan rows of an outer table intersection of the outer table, wherein remainder time period values that do not overlap with any time period value for matching inner rows are outputted with a NULL value for inner table column values.

29. The non-transient tangible storage medium of claim 27, further including executable instructions that cause the computer to initialize the outer table time period value set with the outer table intersection for each outer row.

30. The non-transient tangible storage medium of claim 27, further including executable instructions that cause the computer to maintain the matching and non-matching time period values.

31. The non-transient tangible storage medium of claim 30, further including executable instructions that cause the computer to initialize the remainder time period value utilizing the outer table intersection value.

32. The non-transient tangible storage medium of claim 31, further including executable instructions that cause the computer to read each matching and overlapping inner table row; determine the overlapping portion of the inner table row with the original outer table intersection value and outputting the overlapped portion as the time period value of the result row.

33. The non-transient tangible storage medium of claim 32, further including executable instructions that cause the computer to: for each matching and overlapping inner table row, replace the remainder time period values with the remainder time period values determined from a new inner table intersection value.

34. The non-transient tangible storage medium of claim 33, wherein each remainder time period value determination is the LDIFF of the remainder time period value and the new inner table intersection value and the RDIFF of the remainder time period value and the new inner table intersection value.

35. The non-transient tangible storage medium of claim 34, further including executable instructions that cause the computer to determine if the remainder time period values set is NULL, and if so, then a flag to refrain from carrying out a refresh operation for all future matching and overlapping inner table rows.

36. The non-transient tangible storage medium of claim 35, further including executable instructions that cause a computer to determine if no more matching inner rows exist and the remainder time period values set is not NULL, and if so, then output a row for each of the remainder time period value from the set with the remainder time period value as the time period value of the output row and with the columns of the inner table row set to NULL for the result.

37. The non-transient tangible storage medium of claim 36, further including executable instructions that cause the computer to sort the inner and outer rows on the join columns.

38. The non-transient tangible storage medium of claim 37, further including executable instructions that cause the computer to determine whether the hash value of the new inner table row is greater than the hash value of the outer table row, and if so, then output each of the remainder time period values from the set as the time period value of the result row.

39. The non-transient tangible storage medium of claim 38, further including executable instructions that cause the computer to output all outer table rows that have a non-NULL outer table intersection value.

40. A database that includes one or more processors operable to join two or more temporal database tables on at least one join condition, wherein the temporal database tables involved in the join include an inner table and an outer table, and wherein the join is performed at least by:
   (i) determining a selected table intersection between a period of interest and a time period value for a selected table row of the outer table;
   scanning the inner table for a row that matches the selected table intersection on the at least one join condition and overlaps the selected table intersection; and
   (ii) determining, for one or more rows of the inner table that match the selected table intersection, one or more remainder time period values from the selected table intersection.

41. The database of claim 40, wherein the database includes multiple database nodes operable to join the two or more temporal database tables in parallel by at least performing the determining (i) and determining (ii) in parallel.

42. A database,
   wherein the database includes one or more processors operable to provide an optimization means for joining two or more temporal database tables based on at least one join condition, wherein the temporal database tables involved in the joining include an inner and an outer table, and
   wherein the optimization means includes:
   (i) a first means for determining a selected table intersection between a period of interest and a time period value for a selected table row of the outer table;
   a means for scanning the inner table for a row that matches the selected table intersection on the at least one join condition and overlaps the selected table intersection; and
   (ii) a second means for determining for one or more rows of the inner table that match the selected table intersection, one or more remainder time period values from the selected table intersection.

* * * * *